US007470895B1

(12) United States Patent
Cramer et al.

(10) Patent No.: US 7,470,895 B1
(45) Date of Patent: Dec. 30, 2008

(54) SUBMERSIBLE POWER SUPPLY WITH INTEGRAL PHOTOCELL

(75) Inventors: Douglas D. Cramer, Kansas City, MO (US); Roy L. Watkins, Grandview, MO (US)

(73) Assignee: Air-O-Lator Corporation, Kansas City, MO (US)

( * ) Notice: Subject to any disclaimer, the term of this patent is extended or adjusted under 35 U.S.C. 154(b) by 86 days.

(21) Appl. No.: 11/618,781

(22) Filed: Dec. 30, 2006

(51) Int. Cl.
*H01J 5/02* (2006.01)
*H01J 40/14* (2006.01)
*H02B 1/26* (2006.01)

(52) U.S. Cl. ........................ 250/239; 250/206; 361/641

(58) Field of Classification Search ................. 250/239, 250/206, 214.1, 214 R, 216; 361/641, 600, 361/620; 327/190, 304
See application file for complete search history.

(56) References Cited

U.S. PATENT DOCUMENTS 2,970,222 A 1/1961 Husby et al.
3,398,291 A 8/1968 Zertoss
3,543,099 A 11/1970 Turner
3,949,211 A 4/1976 Elms
4,539,629 A 9/1985 Poppenheimer
4,907,139 A 3/1990 Quiogue
5,285,349 A * 2/1994 Zander et al. ............... 361/641
5,718,379 A 2/1998 Cramer
6,111,249 A 8/2000 Garner, III
6,583,700 B1 6/2003 Beadle
6,670,604 B1 12/2003 De Maria et al.
RE38,767 E 8/2005 Wedell et al.
2006/0002104 A1 1/2006 Wills et al.

OTHER PUBLICATIONS

Light Kit Assembly Parts List-Drawing of power supply for light assembly kit (with lid for housing not shown) which was offered for sale and sold more than 1 year prior to the filing date of the present application. Drawing dated Jun. 2, 2004.

Photograph of top of Power Supply for Light Kit Assembly referenced above and showing the lid for the housing and which was offered for sale and sold more than 1 year prior to filing date of the present application.

* cited by examiner

*Primary Examiner*—Georgia Y Epps
*Assistant Examiner*—Don Williams
(74) *Attorney, Agent, or Firm*—Erickson, Kernell, Derusseau & Kleypas, LLC

(57) ABSTRACT

A submersible transformer assembly including a housing for holding an electrical transformer and having an aperture in a top panel of said housing for receiving a photocell assembly, the photocell assembly including a photocell positioned above the housing and electrically coupled with a socket held within the aperture by a socket retainer mounted to the underside of the housing top panel below the aperture. A transparent photocell cover or lens is mounted on top of the housing in covering and sealing relationship with the photocell and the aperture. The transformer positioned within the housing is electrically governed by the photocell which switches power to the transformer on and off in response to changes in ambient light conditions.

10 Claims, 3 Drawing Sheets

SUBMERSIBLE POWER SUPPLY WITH INTEGRAL PHOTOCELL

BACKGROUND OF THE INVENTION

The present invention relates to transformers for supplying power to lighting fixtures or other electrical equipment, such as fountains positioned in bodies of water, and which utilize photocells to control the power supplied by the transformer in response to changes in ambient light levels.

Transformers for providing electrical power to outdoor utilities or fixtures, including sub-grade or underwater lighting, are known in the prior art and include transformers for supplying low voltage power thereto. Photocells have been used to control electrical power supplied to fixtures associated with such transformers; however, they are typically separated by a length of conduit from the body of the transformer. While operable, such systems often require some on-site assembly and existing systems are not known to have been rated for submergence. The transformers used in such systems are typically maintained on shore or on a float associated with the lighting or other electrical equipment and are not specifically intended to be submerged. However, the current National Electric Code (2005) requires that electrical equipment and transformers that are maintained within a certain vertical distance relative to a normal level for specified types of bodies of water must be rated for submergence.

As used herein, the term "photocell" refers to a pre-assembled, photoelectric component existing in the prior art. A photocell typically includes a photodetector such as a photoresistor, photodiode, phototransistor or photovoltaic cell. Photocells, and associated circuitry and mounting hardware, may be used to regulate 120V or 240V electrical power such that power is allowed to flow through the regulated circuit when no or minimal light strikes the photocell, and power is not allowed to flow through the regulated circuit when light, of an intensity typically considered sufficient to constitute daylight, strikes the photocell. Most commonly, the photosensitivity of a photocell is provided by a cadmium sulfide photoresistor.

The term "transformer" is intended to have its ordinary meaning and generally refers to an electrical device that uses magnetic coupling to enable a primary circuit to induce a current in a secondary circuit. Typically, high voltage electrical power is provided to the transformer, in which lower voltage electrical power is thereby induced.

BRIEF SUMMARY OF THE INVENTION

A submersible power supply includes a transformer sealed within a waterproof housing and a photocell also sealed within the housing by a transparent or translucent cover such that light may pass through the cover to strike the photocell. The photocell regulates the transmission of low voltage current, provided by the transformer, to one or more low voltage electrical fixtures or appliances such as submerged lamps.

One embodiment of the submersible power supply includes a housing having a bottom, a peripheral sidewall and a top panel. A portion of the housing, typically the top panel, is removably securable to the rest of the housing a watertight seal to provide access to an interior of the housing in which the transformer is mounted.

An aperture extends through the top panel of the housing. A photocell socket is disposed within the housing and below and in general axial alignment with the top panel aperture. The photocell socket is retained in place by a socket retainer attached to the bottom of the housing top panel. Preferably, the electrical connections of the socket are rendered watertight by filling a portion of the socket retainer with an approved potting compound.

Electrical connectors (not shown) on the photocell are inserted into the socket through the aperture in the housing top panel to electrically couple the photocell to the socket. The photocell typically projects upward from the aperture so that it extends above the top panel of the housing. The photocell is protected, and the aperture fully closed and rendered watertight, by attaching a photocell cover, cap or lens to the housing top panel and over the photocell. The photocell cover is at least translucent and preferably substantially transparent. An appropriate photocell cover may be formed of clear acrylic plastic. The photocell cover includes a closed top end and a perimeter wall or side projecting downward from the top end. The bottom margin of the wall defines a bottom opening. A flange projects radially outward from the bottom margin of the wall to surround the bottom opening. The photocell cover is positioned over the photocell so that the photocell is enclosed by the wall and top end. Bolts or screws attach the photocell cover to the top panel of the housing, squeezing or compressing the gasket and forming a watertight seal. Typically the photocell cover, the photocell, the aperture in the housing top panel, the socket and the socket retainer are in substantial axial alignment with one another.

The transformer is positioned and retained within the housing by bosses projecting upward from the bottom of the housing and downward from the bottom surface of the top panel. The bosses cooperate to hold the transformer in place within the housing so that it does not shift when the power supply is moved. The transformer is in electrical engagement with the photocell so that electrical power provided by the transformer to electrical fixtures or appliances exterior to the housing is regulated by the photocell in response to ambient light levels.

DETAILED DESCRIPTION OF THE INVENTION

Figure 1:
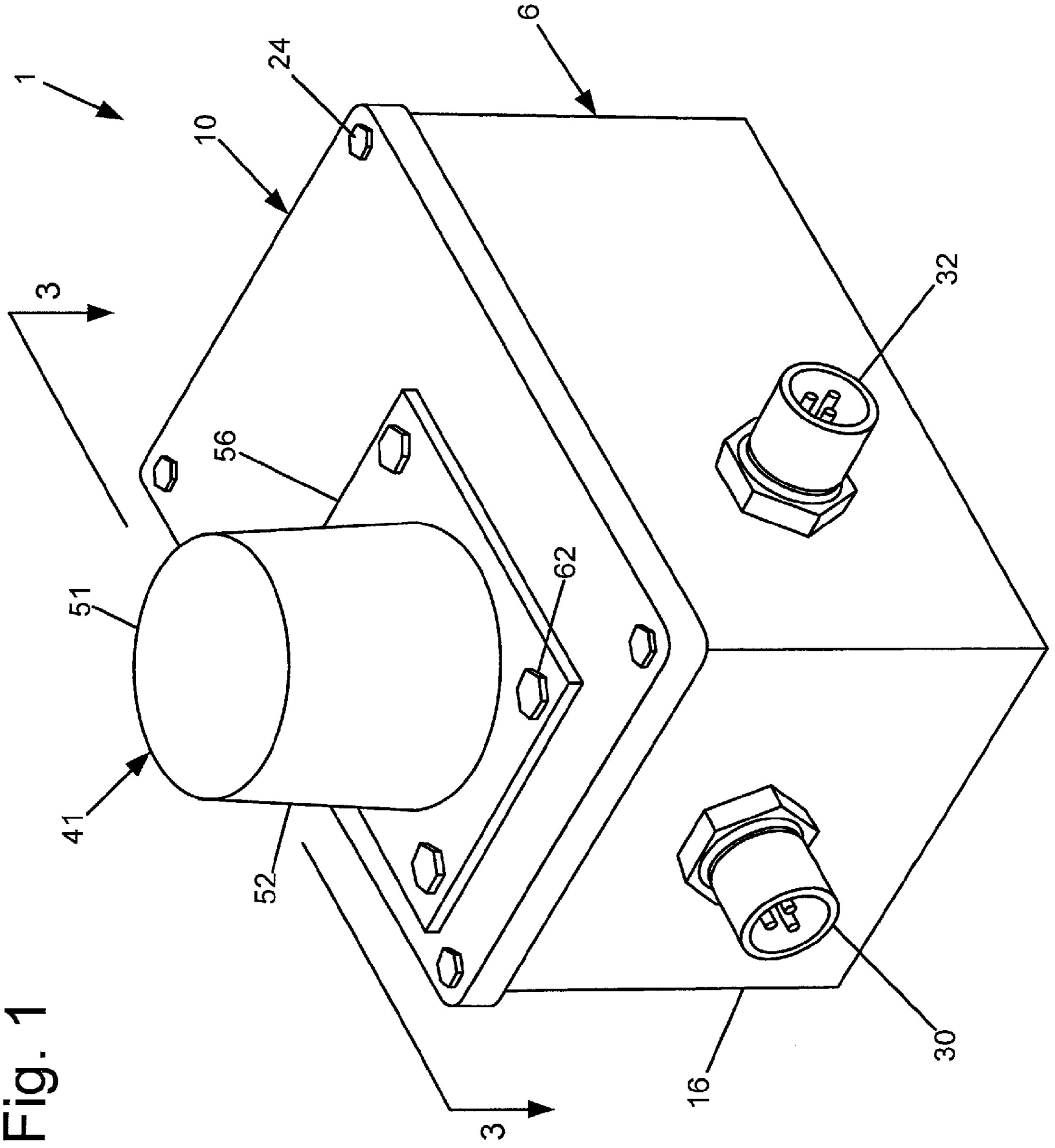
FIG. 1 is a perspective view of a submersible power supply according to the present invention.
Figure 2:
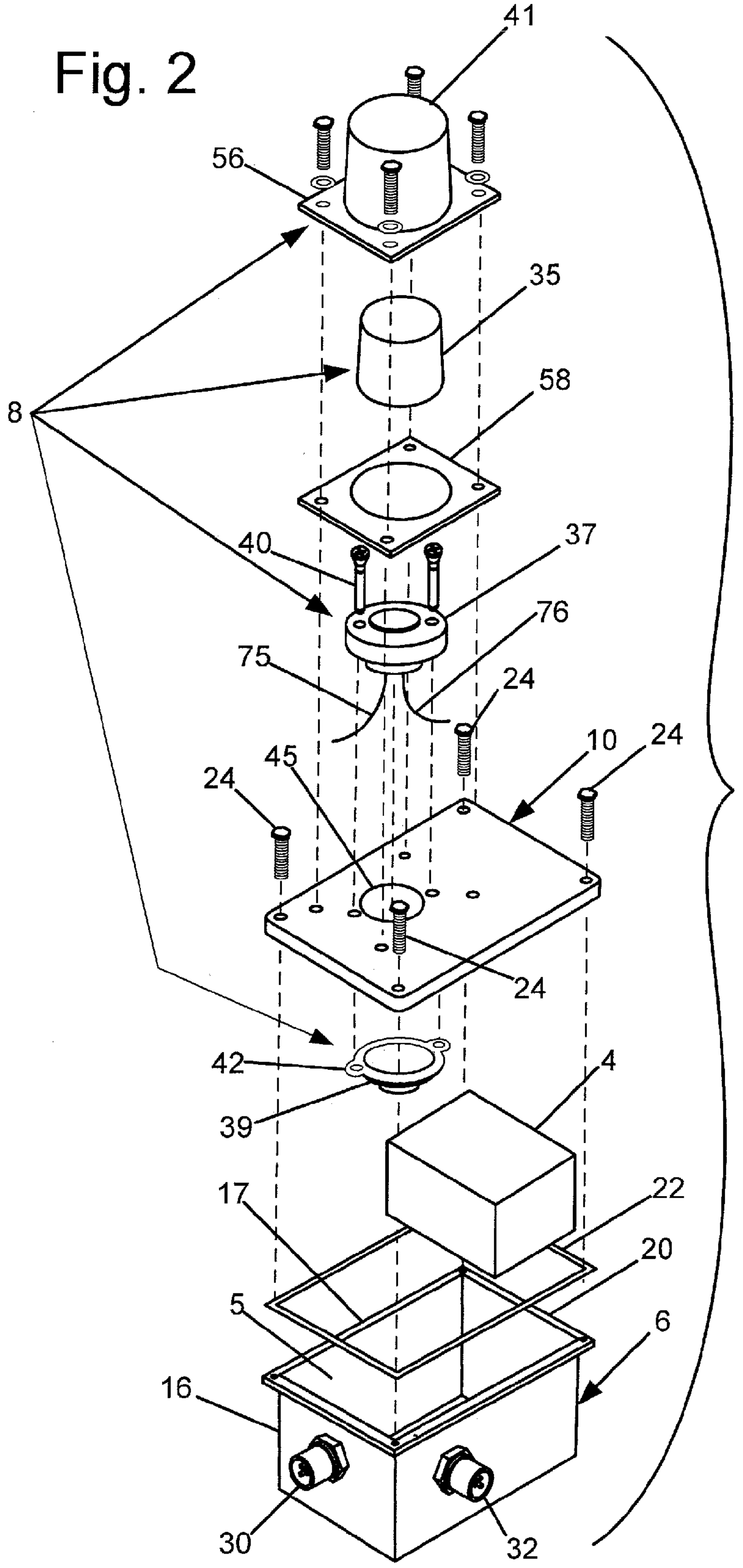
FIG. 2 is an exploded, perspective view of the submersible power supply of FIG. 1.

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings, a submersible power supply 1 comprises an electrical transformer 4 (typically 120V or 240V AC primary voltage to 12V AC secondary voltage) mounted within an interior compartment 5 of a water tight housing 6 and a photocell assembly 8 mounted on and projecting upward from a cover or top panel 10 of the housing 6. The photocell assembly 8 is electrically connected to a transformer circuit 13 as described in more detail hereafter and shown schematically in FIG. 3.

In the embodiment shown, in addition to the top panel 10, the housing 6 includes a relatively planar bottom 15 and a continuous sidewall 16 extending upward from the bottom 15 to an open upper end 17. The sidewall 16 is formed from four relatively planar side panels. The top panel 10 is removably securable to the upper end 17 of the sidewall 16. Although the housing is shown with a removable top panel or cover 10 to provide access to the interior compartment 5 thereof, alternatively the bottom 15 or one or more of the side panels 16 could be removable to provide such access. The dimensions and shape of the housing and the sides, top panel and bottom thereof may be varied.

A sealing flange 20 is formed on and projects radially outward from the upper end 17 of sidewall 16. The top panel or lid 10 of the housing is sized slightly larger than the sidewall sealing flange 20. A gasket or other flexible sealant or sealing member 22 is positioned on the sealing flange 20 and beneath the outer periphery of the housing top panel 10 when it is positioned across the open upper end 17 of sidewall 16. The top panel 10 is secured in place and drawn toward the sealing flange by bolts 24 and nuts 25, or other appropriate fasteners, to form a water-tight seal around the margins of the sidewall upper end 17. The housing 6 is typically formed via injection molding or via vacuum forming of polymeric plastic material. Other rigid, water impermeable materials may be used but reference should be made to appropriate laws or codes covering electrical fixtures, particularly fixtures for use when submerged in water, prior to selected materials.

An appropriate transformer 4 may be selected from devices in the prior art in consideration of power supply requirements of lighting units or other electrical devices to be powered by the transformer 4. Preferably, the transformer 4 selected is manufactured to pool and spa specifications and can withstand submersion without creating a shock hazard should the housing 6 be damaged. The transformer 4 is positioned and retained within the housing 6, typically by bosses 28 projecting upward from the bottom 15 of the housing 6 and downward from the lower surface of the housing top panel 10. The bosses 28 are typically integrally formed in the housing bottom 15 and top panel 10.

Line voltage (typically 120V or 240V which may be referred to as high voltage herein) is supplied to the transformer 4 through an inlet power supply cable (not shown) which is removably connectable to the transformer circuit 13 through a first submersible electrical connector 30 mounted on the housing sidewall 16. A second submersible electrical connector 32 is also mounted on the housing sidewall 16 and connected to the transformer circuit 13 for distributing reduced voltage electricity (typically 12V which may be referred to as low voltage herein) through an outlet power supply cable (not shown) removably connectable thereto. Appropriate submersible electrical connectors 30 and 32 are to be rated IP 68 which facilitate formation of a watertight seal between the IP 68 connectors and the power supply cables (not shown) connected thereto. The IP (ingress protection) rating system is maintained by the International Electrotechnical Commission (IEC). An IP 68 device is completely sealed against infiltration by particulates and water.

Each submersible connector 30 and 32 is attached to and extends through an opening in the housing sidewall 16. An epoxy 33 may be used to fill any voids between the connectors 30 and 32 and the sidewall 16 to form a watertight seal.

Figure 3:
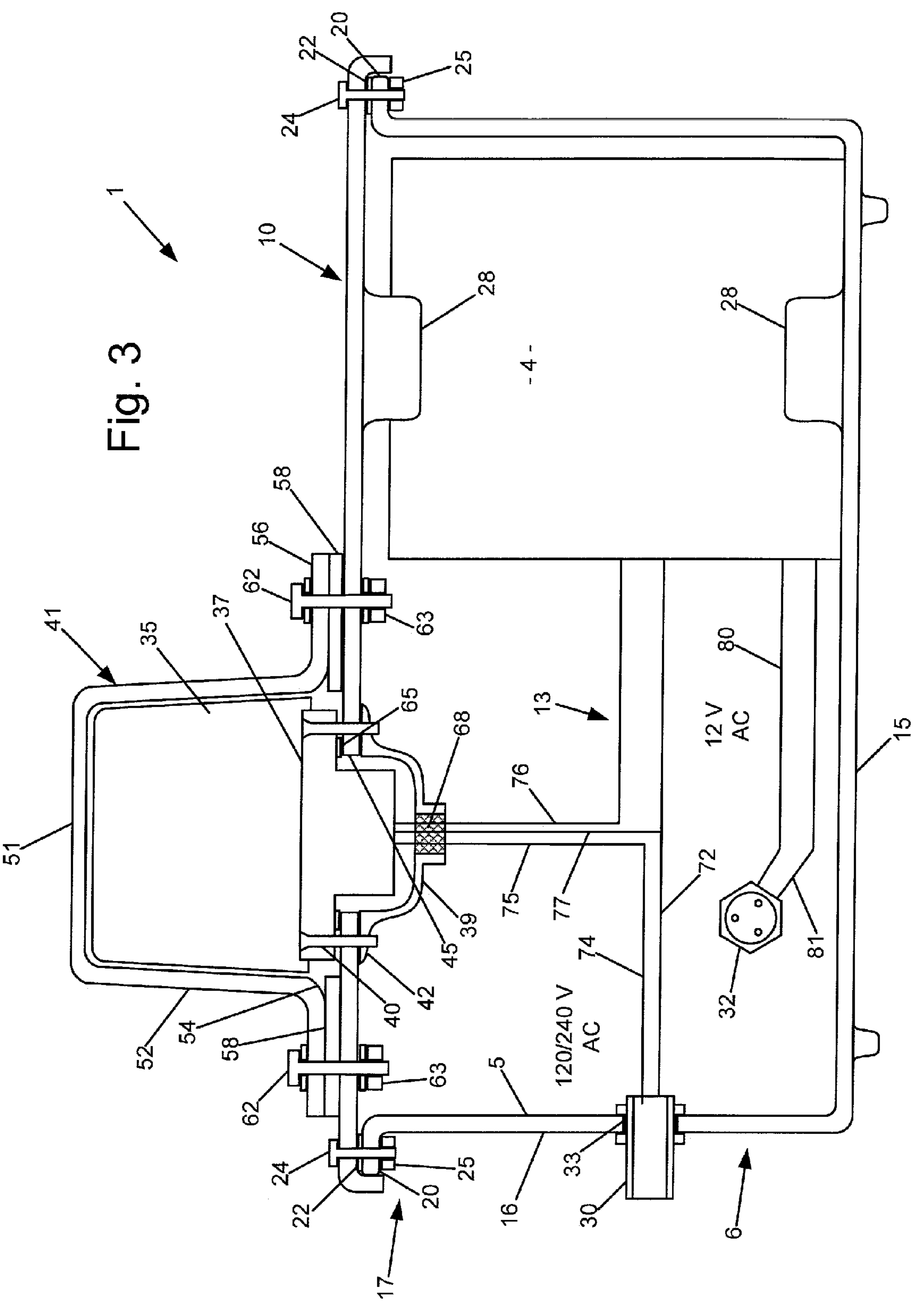
FIG. 3 is a partially schematic view showing all internal components of a submersible power supply in diagrammatical cross-section and in particular showing the photocell cover, photocell, photocell cover gasket, photocell socket and retainer, and cover sectioned along line 3-3 in FIG. 1.

The photocell assembly 8 includes a photocell 35, a photocell socket 37, a socket retainer 39 and a photocell cover 41. Referring to FIG. 3, an opening or aperture 45 is formed in the top panel 10 of the housing 6 through which the photocell assembly 8 extends and through which it is connected to the transformer circuit 13. The socket retainer 39, which is generally bowl shaped, is mounted to and extends below the housing top panel 10 around the aperture 45. Typically, the socket retainer 39 is adhered to the bottom of the housing top panel 10 using an epoxy adhesive which forms a seal therebetween, however, it is to be understood that the socket retainer 39 could be integrally formed with the housing top panel 10.

The photocell socket 37 is mounted in the socket retainer 39 with an upper surface of the socket extending flush with or above an upper surface of the housing top panel 10 or accessible through the aperture 45. Screws 40 are passed through the socket 37 and the housing top panel 10 to engage bosses 42 projecting laterally from the retainer 39. The photocell 35 includes male connectors (not shown) at a lower end thereof for connecting to receptacles (not shown) in the socket 37. The photocell socket 37 is wired to the transformer circuit through an opening in a lower end of the socket retainer 39 as discussed in more detail below.

The photocell cover 41, which may also be referred to as a water shield or water shield cover, a cap or a lens is made of translucent or transparent material to allow light to pass through the lens 41 and strike the photocell 35. The lens 41 may be molded, for example, from an acrylic plastic. The photocell cover 41 as shown is generally cup shaped with a closed top 51, a cylindrical sidewall 52, and an open bottom end 54 with a mounting flange 56 extending radially outward from the open bottom end 54. The photocell cover 41 is positioned over and in covering relationship with the photocell 35 and the socket 37. A photocell cover sealing gasket 58, or primary photocell seal, is positioned between the photocell cover mounting flange 56 and an upper surface of the housing top panel 10 around the aperture 45. The photocell cover 41 is bolted to the housing top panel 10 with bolts 62 extending through the mounting flange 56 and the top panel 10 and secured in place with nuts 63, with the gasket 58 forming a watertight seal therebetween. A socket sealing member or gasket 65, or secondary photocell seal, may be positioned between the photocell socket 37 and the housing top panel 10 to form a seal between the socket 37 and the housing top panel 10. Appropriate materials for forming the gaskets or seals 22, 58 and 65 include rubber, silicone, viton, neoprene, vinyl, nitrile, or urethane. A potting compound 68 is typically applied to the wiring for the photocell socket 37 in the socket retainer 39 to assure a water tight seal should the photocell cover ever become cracked or broken, or should the primary or secondary seals 58 and 65 fail.

The photocell 35 functions as a switch to selectively allow or disrupt the flow of high voltage electricity to the transformer 4 through the transformer circuitry 13, thereby concomitantly allowing or interrupting the supply of lower voltage electricity to any devices operated off the transformer.

The transformer circuit 13 includes first and second line voltage leads 72 and 74 connecting the first connector 30 to the transformer 4, with the second line voltage lead 74 connected through the photocell 35. In particular, a first leg 75 of the second line voltage lead 74 extends from the first connector 30 to a first terminal (not shown) on the photocell socket 37. A second leg 76 of the second line voltage lead 74 extends from a second terminal (not shown) on the photocell socket 37 to the transformer 4. Branch wire 77 extends from a third terminal (not shown) on the photocell socket to the first line voltage lead 72 such that power is continuously supplied to the photocell 35 through a power line connected to the first connector 30. First and second low voltage or reduced voltage leads 80 and 82 extend between the transformer 4 and the second, reduced voltage connector 32. Because the photocell 35 is connected to one of the leads, lead 74, extending between the first connector 30 and the transformer 4, the photocell 35 operates to selectively supply power to or turn on and off the transformer 4.

In accordance with the foregoing, when the photocell 35 is in an open state, high voltage electricity flows through the transformer 4 generating low voltage electricity which can be delivered to a selected electrical device through the second or low voltage electrical connector 32. Typically, the photocell 35 is selected to maintain an open state when ambient light levels are low, as during night, and to maintain a closed state when ambient light levels are high, as during day. The photocell 35 is preferably of the type that may be used to regulate 120V or 240V electrical power supplied to the transformer such that power is allowed to flow through the transformer circuit 13 when no or minimal light strikes the photocell 35, and power is not allowed to flow through the transformer circuit 13 when light, of an intensity typically considered sufficient to constitute daylight, strikes the photocell 35.

By selecting appropriate, waterproof material for the lens gasket 58 and lid gasket 22 from the materials described above (or functional equivalents), polymer plastic materials such as PVC, ABS, GLV80 or equivalent material for the housing 6, acrylic plastic or equivalent material for the lens 41, and IP 68 rated electrical connectors 30 and 32, and use of approved potting compounds 68, the embodiment of the invention discussed above meets or exceeds standards set by the National Electric Code for resistance to water infiltration as an entire unit, including Articles 680.52(B)(2) and 682.10. In tests, the interior of the embodiment described remained dry after submergence to a depth of 5 feet for 24 hours.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A submersible transformer assembly comprising:
- a housing for holding an electrical transformer and having an aperture formed in a top panel thereof,
- a photocell assembly including a photocell and a photocell cover, said photocell assembly extending through said aperture in said housing top panel and said photocell cover extending in covering relationship over and around said photocell and said aperture in said top panel, said photocell cover being transparent and having a mounting flange projecting radially outward from a lower end thereof for connecting said photocell cover to said top panel,
- a gasket positioned between the lower surface of said flange and a top portion of said top panel proximate and surrounding said aperture to prevent water from entering said housing through said aperture, and
- a transformer positioned within said housing and electrically connected to said photocell whereby electrical power provided by said transformer is regulated by said photocell.

2. The submersible transformer assembly as in claim 1 wherein said gasket comprises a material selected from the group consisting of rubber, silicone, viton, neoprene, vinyl, nitrile and urethane.

3. The submersible transformer assembly as in claim 1 further comprising a photocell socket electrically coupled to the photocell; said photocell socket connected to said top panel of said housing with a seal disposed between said photocell socket and said top panel to form a watertight seal therebetween.

4. The submersible transformer assembly as in claim 3 further comprising a socket retainer secured to the underside of the top panel of the housing and supporting said socket relative to said aperture in said top panel.

5. A submersible power supply comprising:
- a housing having a bottom and a continuous sidewall extending upwardly therefrom to form an enclosure with an open upper end and a lid sized to close said open upper end of said housing sidewall, said lid including a top surface, a bottom surface, a perimeter and an aperture extending through said top and bottom surfaces to form a passage through said lid;
- means for attaching said lid to said sidewall to close said open upper end thereof;
- means for forming a watertight seal between said lid and said sidewall;
- a retainer connected to and extending below said lid around said aperture;
- a photocell socket disposed within said retainer and extending upward therefrom in axial alignment with said aperture in said lid;
- a photocell electrically coupled with said socket and extending above an upper surface of said lid,
- a lens mounted on said lid of said housing in watertight engagement therewith and extending in covering relation over said photocell and said aperture in said lid,
- a transformer positioned within said housing and in electrical engagement with said photocell whereby electrical power provided supplied by said transformer is regulated by said photocell in response to changes in the level of light detected by said photocell.

6. The submersible power supply of claim 5 further comprising a seal positioned between the lower surface of said flange and a top portion of said cover surrounding and proximate said aperture.

7. The submersible power supply as in claim 6 further comprising a seal positioned between said socket and said top panel of said housing.

8. A submersible power supply comprising:
- a housing having a water-impermeable bottom, water-impermeable enclosing sides projecting upwardly therefrom, and an open top end presenting an opening,
- a relatively planar lid sized to close said opening, said lid having an upper surface and a lower surface,
- means for attaching said lid to said opening to form a water-tight seal therebetween,
- an aperture in said lid, said aperture having a diameter sufficient for receiving a photocell,
- a generally bowl shaped socket retainer extending downward from the lower surface of said lid, the upper portion of said retainer surrounding and defining said aperture, the lower portion of said retainer extending into said housing,
- a photocell socket disposed within said retainer, the upper surface of said socket presenting means for electronically coupling to a photocell,
- a transformer disposed within said housing and electrically connected to said socket,
- a photocell coupled to said socket and projecting upwardly therefrom,
- a lens attached to said upper surface of said lid to enclose said photocell and said aperture, and
- means for forming a water-tight seal between said lens and said lid.

9. The power supply of claim 8 wherein said socket is retained within said retainer using waterproof potting compound, thereby forming a water-tight between said socket and said retainer.

10. The power supply of claim 8 wherein said retainer is attached to the underside of said lid in general axial alignment with said aperture.

* * * * *